United States Patent [19]
Rajagopalan

[11] Patent Number: 6,121,384
[45] Date of Patent: Sep. 19, 2000

[54] GOLF BALL COVER COMPOSITIONS AND METHOD OF MAKING SAME

[75] Inventor: Murali Rajagopalan, South Dartmouth, Mass.

[73] Assignee: Acushnet Company, Fairhaven, Mass.

[21] Appl. No.: 09/215,370

[22] Filed: Dec. 18, 1998

Related U.S. Application Data

[62] Division of application No. 08/978,510, Nov. 25, 1997, Pat. No. 5,869,578, which is a continuation of application No. 08/560,763, Nov. 21, 1995, abandoned.

[51] Int. Cl.$^7$ .................................................. A63B 37/12
[52] U.S. Cl. ..................... 525/221; 525/330.6; 525/539; 473/371; 473/372; 473/378; 473/385
[58] Field of Search ................................ 525/221, 330.6, 525/539; 473/371, 372, 378, 385

[56] References Cited

U.S. PATENT DOCUMENTS

| | | |
|---|---|---|
| 3,264,272 | 8/1966 | Rees . |
| 3,472,825 | 10/1969 | Walter et al. . |
| 3,819,768 | 6/1974 | Molitor . |
| 3,926,891 | 12/1975 | Gross et al. . |
| 3,970,626 | 7/1976 | Hurst et al. . |
| 4,323,247 | 4/1982 | Keches et al. . |
| 4,431,193 | 2/1984 | Nesbitt . |
| 4,508,309 | 4/1985 | Brown . |
| 4,526,375 | 7/1985 | Nakada . |
| 4,638,034 | 1/1987 | McClain . |
| 4,884,814 | 12/1989 | Sullivan . |
| 4,911,451 | 3/1990 | Sullivan et al. . |
| 5,155,157 | 10/1992 | Statz et al. . |
| 5,218,057 | 6/1993 | Kurkov et al. . |
| 5,324,783 | 6/1994 | Sullivan . |
| 5,508,351 | 4/1996 | Horiuichi et al. . |
| 5,554,698 | 9/1996 | Wang et al. . |

FOREIGN PATENT DOCUMENTS

| | | |
|---|---|---|
| 963380 | 2/1975 | Canada . |
| 0115190 B1 | 8/1984 | European Pat. Off. . |
| 0104316 B1 | 11/1987 | European Pat. Off. . |
| WO93/06137 | 4/1993 | WIPO . |
| WO96/23009 | 8/1996 | WIPO . |

*Primary Examiner*—David Buttner
*Attorney, Agent, or Firm*—Pennie & Edmonds LLP

[57] ABSTRACT

A process for forming a golf ball cover composition, which process comprises: a) forming a polymer comprising (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms, and a vinyl ester or vinyl ether of an alkyl acid having from 4 to 21 carbon atoms; b) applying a sufficient amount of heat to the polymer to convert it to a substantially molten state; c) adding an inorganic metal base to the molten polymer to form a mixture; and d) saponifying the mixture to form a polymer salt particularly adapted for forming improved golf ball covers.

24 Claims, No Drawings

GOLF BALL COVER COMPOSITIONS AND METHOD OF MAKING SAME

This is a division of application Ser. No. 08/978,510, filed Nov. 25, 1997 now U.S. Pat. No. 5,869,578 which is a continuation of application no. 08/560,763 filed Nov. 21, 1995, abandoned.

TECHNICAL FIELD

The invention relates generally to golf balls and, more particularly, to a method of making a saponified polymeric material for use in forming golf ball covers.

BACKGROUND OF THE INVENTION

Throughout its history, the golf ball has undergone an extensive evolution in an effort to improve its play-related characteristics, e.g., durability, distance, and control. Modern day golf balls can be classified as one-piece, two-piece, and three-piece (also known as "wound") balls. One-piece balls are formed from a homogeneous mass of material with a dimple pattern molded therein. One-piece balls are inexpensive and very durable, but do not provide great distance because of relatively high spin and low velocity.

Two-piece balls are the most popular types of ball in use today. They are made by molding a cover around a solid core. Conventionally, both two-piece and three-piece golf balls are made by molding covers about cores in one of two ways: by injection molding of fluid cover stock material around a core which is held in a retractable pin mold; or by compression molding preformed half-shells about the core. The preformed half-shells are formed by injecting fluid cover stock material into half-shell molds and solidifying the cover stock material into a corresponding shape.

Golf ball cores, whether wound or solid, typically measure from 1.4 to 1.6 inches (3.5 to 4.1 cm) in diameter. The cover is molded about the core to form a golf ball having the minimum United States Golf Association (USGA) specified diameter of 1.68 inches (4.3 cm). Typically, the cover has a thickness of about 0.04 inches (0.1 cm). Two-piece balls typically have a hard "cutproof" cover which gives a longer distance ball, but which has lower spin rates, resulting in a decreased ability to control the ball.

Three-piece or wound balls are made by molding a cover about a wound core. The core is typically made of rubber and can be solid, semi-solid or have a fluid, e.g., liquid-filled center. A wound core is prepared by winding a thin thread of elastic material about the center core. The wound core is then covered with a durable cover material. Wound balls are generally softer and provide more spin, resulting in increased control over the ball, but such balls typically travel a shorter distance than that traveled by a two piece ball. As a result of their more complex construction, wound balls generally require a longer time to manufacture and are more expensive to produce than two-piece balls.

The covers of golf balls sold today are made from a variety of materials, such as balata, SURLYN® and IOTEK®. Balata, i.e., a natural or synthetic trans-polyisoprene rubber is the softest of these cover materials. For many years, balata was the standard cover stock material for most golf balls. Balata covered balls are favored among professionals and more advanced amateur players because the softness of the cover allows the player to achieve spin rates sufficient to more precisely control ball direction and distance, particularly on shorter approach shots.

However, balata covered balls are expensive and less durable as compared to the other covering materials. In particular, balata covered balls are subject to nicks or cuts as a result of a mis-swung golf club, which is not uncommon with the average recreational golfer. Such nicks or cuts detract from the flight characteristics of such balls, rendering them of little use. Accordingly, cover compositions have been developed in an attempt to provide spin rates and a feel approaching those of balata covered balls, while also providing a golf ball with a higher durability and overall distance.

In the mid-1960s, E.I. DuPont de Nemours and Co. discovered a species of resins known as ionomer resins which, to a large extent, have replaced balata as a cover stock material. Chemically, these ionomer resins are a copolymer of an olefin and an alpha, beta ethylenically unsaturated carboxylic acid with 10–90% of the carboxylic acid groups neutralized by a metal ion. See U.S. Pat. No. 3,264,272, issued Aug. 2, 1966. Today, commercially available ionomer resins include, for example, copolymers of ethylene and methacrylic or acrylic acid, e.g., sold by E.I. DuPont de Nemours and Co. under the trademark "SURLYN®" and by the Exxon Corporation under trademark "IOTEK®". These ionomer resins are distinguished by the type of metal ion, the amount of acid, and the degree of neutralization. In addition, Chevron Chemical Co. more recently introduced a family of ionomers produced from ethylene acrylate based copolymers, sold under the trademark "IMAC®".

Dunlop Rubber Company obtained the first patent on the use of SURLYN® for the cover of a golf ball, i.e., U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul. 2, 1985; 4,884,814 issued Dec. 3, 1989; and 4,911,451 issued Mar. 27, 1990. However, while SURLYN® covered golf balls as described in the preceding patents possess virtually cutproof covers, they have inferior spin and feel properties as compared to balata covered balls.

In November, 1986, DuPont introduced a sodium and zinc ionomer resin having a low flexural modulus and suggested using and blending the same with other ionomer resins for making a golf ball cover. Golf ball covers made from these low flexural modulus ionomer resins have improved spin and feel characteristics but relatively low velocity.

In Dec., 1986, DuPont introduced a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

The USGA has promulgated a rule that no golf ball shall have an initial velocity that exceeds 255 feet (78 m) per second, i.e., 250 feet (76 m) per second with a 2% tolerance. Golf balls with covers made from ionomer resins with a low flexural modulus are woefully below this maximum and, as should be appreciated, all golf ball manufacturers strive to come as close as possible to this limit.

In various attempts to produce an ideal golf ball, the golfing industry has blended hard ionomer resins (i.e., those ionomer resins having a hardness of about 60 to 66 on the Shore D scale as measured in accordance with ASTM method D-2240) with a number of softer polymeric materials, such as softer polyurethanes. However, the blends of the hard ionomer resins with the softer polymeric materials have generally been unsatisfactory in that these balls exhibit numerous processing problems. In addition, the balls produced by such a combination are usually short on distance.

In addition, various hard-soft ionomer blends, i.e., mixtures of ionomer resins which are significantly different in hardness and/or flexural modulus, have been attempted. U.S. Pat. No. 4,884,814 discloses the blending of various hard methacrylic based ionomer resins with similar or larger quantities of one or more "soft" ionomer methacrylic acid based ionomer resins (i.e., those ionomer resins having a hardness from about 25 to 40 as measured on the Shore D scale) to produce relatively low modulus golf ball cover compositions that are not only softer than the prior art hard ionomer covers but also exhibit a sufficient degree of durability for repetitive play. These relatively low modulus cover compositions were generally comprised of from about 25 to 70 percent of hard ionomer resins and from about 30 to about 75 percent of soft ionomer resins.

U.S. Pat. No. 5,324,783 to Sullivan discloses golf ball cover compositions comprising a blend of a relatively large amount, e.g., 70–90 wt. %, of hard ionomer resins with a relatively low amount, e.g., 10 to about 25–30 wt. %, of soft ionomers. The hard ionomers are sodium or zinc salts of a copolymer of an olefin having from 2 to 8 carbon atoms and an unsaturated monocarboxylic acid having from 3 to 8 carbon atoms. The soft ionomer is a sodium or a zinc salt of a terpolymer of an olefin having from 2 to 8 carbon atoms, methacrylic acid and an unsaturated monomer of the acrylate ester class having from 1 to 21 carbon atoms.

In order to approximate the characteristics of balata covered balls at lower cost, the art has developed balls having a variety of cover compositions. There are more than fifty commercial grades of ionomers available from DuPont and Exxon with a wide range of properties which vary according to the type and amount of metal cations, molecular weight, composition of the base resin (i.e., relative content of ethylene and methacrylic and/or acrylic acid groups) and additive ingredients such as reinforcements, etc. As noted above, these prior art compositions have a considerably higher cut resistance and durability as compared to balata covered balls. A great deal of research continues in order to develop golf ball cover compositions exhibiting not only improved impact resistance and carrying distance properties produced by the "hard" ionomeric resins, but also the playability (i.e. "spin") characteristics previously associated with the "soft" balata covers, properties which are still desired by the more skilled golfer.

However, despite numerous attempts to replicate the performance of balata covered balls, the golf ball cover compositions of the prior art generally suffer from low spin rates which makes them difficult to control near the greens. Further, such balls tend to have relatively poor "click" and feel as compared to the balata covered balls. Additionally, many of the prior art golf ball cover compositions are made with low flexural modulus ionomer resins which have improved spin and feel characteristics, but relatively low velocity, which results in shorter overall distance.

Consequently, a need exists for a golf ball cover composition which provides spin rates and a feel more closely approximating those of balata covered balls, while also providing as high or a higher degree of durability than that provided by the balls presently available or disclosed in the prior art.

This invention teaches a new route to produce polymers with ionomeric character by selectively carrying out hydrolysis or saponification on copolymers to produce compositions useful in golf balls and their covers. The new cover composition can contain binary, ternary or higher blends of metal cations used to neutralize the polymer. The new family of polymers with ionomeric character can be blended with other polymers, such as SURLYN®, IOTEK® and IMAC® ionomers to produce golf balls and golf ball covers with desirable properties. The golf ball composition can be used for both solid and wound construction balls.

Hydrolysis or saponification of alkyl acrylate units in a crosslinkable polymer chain is disclosed by Gross in U.S. Pat. No. 3,926,891, issued Dec. 16, 1975. This is accomplished by dissolving the polymer in an aqueous alkali metal hydroxide solution and then heating. The product is recovered by coating the solution onto a substrate and evaporating the water or by extruding the solution into a non-solvent. In U.S. Pat. No. 3,970,626, issued Jul. 20, 1976, Hurst discloses heating a mixture of an alkali metal hydroxide, a thermoplastic ethylene-alkyl acrylate copolymer and water to saponify the acrylate units and form an aqueous emulsion. This emulsion can be used as such, partially dried to a paste or moist solid, or fully dried to solid form.

A different approach to hydrolysis or saponification of an ethylene-alkyl acrylate copolymer is disclosed by Kurkov in U.S. Pat. No. 5,218,057, issued Jun. 8, 1993. There, the copolymer is mixed with an aqueous solution of an inorganic alkali metal base at a temperature sufficient for saponification to take place and at which the copolymer undergoes a phase change. Typically, the copolymer would be molten when mixed with the aqueous solution.

All of these prior methods require that the polymer component be in contact with water, either by conducting the reaction in an aqueous medium or by adding an aqueous solution to the polymer. Processes of this nature pose several disadvantages, however. First, it is difficult to remove water from the hydrolyzed or saponified polymer product. The polymer product is in the form of a salt that has a more polar nature than the reactant acrylate ester, and so is more likely to associate with or hydrogen bond to a polar solvent like water. The energy required to remove a highly interacting polar solvent like water is much greater than for a nonpolar or weakly polar organic solvent. Second, it is important to remove water from the ionomer product because the presence of water can have detrimental effects on ionomer mechanical properties imparted by the polar ionic domains, which act as the effective crosslink sites. Residual water weakens the ionic interactions within these domains, thereby reducing the mechanical property benefits the domains impart. Finally, incomplete removal of water can lead to difficulty in later fabricating steps where the product ionomer is reheated and shaped, e.g., into golf ball covers. Residual water can cause undesirable irregularities and imperfections on the surface of fabricated articles by the formation of blisters. Residual water within fabricated polymer articles can lead to void formation and even foaming with a concomitant undesirable influence on the mechanical properties, load bearing capacity and durability of the fabricated articles.

Melt state neutralization of an ethylene-acrylic acid copolymer by a solid, solution or slurry of an alkali metal salt is disclosed by Walter in U.S. Pat. No. 3,472,825, issued Oct. 14, 1969. In the examples provided, hydrolysis is accomplished by mixing an alkali hydroxide with copolymer at constant temperature either in a Banbury mixer or on a two roll mill. Walter does not disclose the use of extrusion type polymer processing apparatus for this neutralization.

McClain, in U.S. Pat. No. 4,638,034, issued Jan. 20, 1987, discloses a process whereby ethylene-acrylic acid copolymers or their ionomers are prepared from ethylene-alkyl acrylate copolymers by saponifying the latter in the melt with metal hydroxides to form an ionomer and a by-product, i.e., alkanol, then optionally acidifying the ionomer to form the free acid copolymer. This process proceeds in the molten state and in the absence of solvent or water, other than the by-product alkanol. Saponification proceeds under non-static mixing conditions, typically with equipment commonly employed in the art of mixing molten polymer materials such as multiroll mills, a Banbury mixer or a twin screw extruder.

The process disclosed by the '034 reference is, however, incapable of providing optimal product quality since blending and saponifying in a single operation as taught by the subject reference leads to rapid hydrolysis, with a concurrent rapid increase in viscosity. Due to this rapid increase in viscosity, the resultant mixture is non-uniform and therefore the physical properties of products made from this material are not consistent throughout the product.

During the melt state conversion of the alkyl-acrylate copolymer to the metal acrylate copolymer salt, a great decrease in melt flow rate occurs with a corresponding great increase in melt viscosity. While not wishing to be bound by any particular theory, this decreased melt flow rate is thought to occur because of the tendency of the relatively polar ionic salt functionalities formed during the saponification reaction to associate with themselves rather than the relatively non-polar unreacted alkyl acrylate or comonomer chain segments. Aggregations of salt moieties arising from sidegroups attached to different chains into ionic domains introduces effective crosslink points throughout the molten copolymer. The effective crosslinks, in turn, greatly increase the copolymer melt viscosity and, correspondingly, greatly decrease copolymer melt flow rate.

SUMMARY OF THE INVENTION

The process of this invention differs fundamentally from prior methods of performing melt hydrolysis or saponification. Instead of simultaneously mixing and hydrolyzing as practiced in the prior art, the presently disclosed process carries out these operations separately in, for example, an extruder or a roll mill, as outlined below. In the first step, the polymer is heated to a substantially molten state at a temperature of between about 50–350° C., depending upon the polymer chosen, to facilitate subsequent mixing with a metal base. This pre-heating step assures a greater degree of homogeneity in the final product, with the final product having correspondingly improved properties.

In the next step, a metal base is added to the molten polymer and the polymer and metal base are extensively mixed under conditions in which no substantial hydrolysis occurs. A sufficient amount of metal base must be added over all to obtain a degree of saponification of the polymer between about 1 and about 50 percent. The mixing is carried out at a temperature slightly higher than the melting temperature of the polymer. For mixing on an extruder, the screw speed can be varied between about 20–500 rpm, depending upon the material's viscosity, i.e., the higher the viscosity, the greater the rpm. Furthermore, the conveying element of the extruder is of a depth chosen, as would be well understood, by one of ordinary skill in the art, to prevent substantial hydrolysis of the material during mixing.

Alternately, as noted above, the mixing may be accomplished using a roll mill. In such a case, the cylinder roll speed is adjusted to between about 5–100 rpm depending upon the viscosity of the material. Additionally, the mill gap is adjusted as necessary to control the amount of shear, and thus the degree of hydrolysis. The metal base may be added all at once to the molten polymer, or alternately it may be introduced in batches or stages.

In a third step, conditions are provided such that a hydrolysis or saponification reaction occurs between the polymer and the metal base. Saponification is achieved by continuous mixing of the polymer and base at an elevated temperature, i.e., substantially higher than the melting point temperature, i.e, with the use, in an extruder, of a kneading element or, in the case of a roller mill, by narrowing the mill gap to provide additional shear.

This novel three step process offers several improvements over the methods disclosed in the prior art. First, it provides for greater ease of mixing of the reactants before the reaction begins. Melt viscosity of the non-salt polymer is much lower than the salt polymer form, so melt mixing of the polymer and metal base is more readily carried out with lower input power requirements. Additionally, mixing of polymer and metal base is more uniform because there are no substantially hydrolyzed or saponified regions of low melt flow or high melt viscosity present within regions which have not yet reacted and therefore have high melt flow and low melt viscosity. Furthermore, the degree of mixing or dispersion of the base in the polymer is more easily controlled since melt flow rate is more uniform throughout the volume of molten polymer.

Once substantial saponification begins, the reaction is thought to be more uniform than the methods disclosed in the prior art. Although not wishing to be bound by any particular theory, the controlled dispersion of reactants in the mixing phase is thought to result in a more uniform melt morphology during the hydrolysis phase. The greater ability to control mixing and its uniformity provided by the multi-step process of this invention are thought to allow a finer morphological texture to develop as the hydrolysis reaction proceeds. That is, smaller size regions arise from dissimilar polarities of the polymer salt formed from hydrolysis and the relatively less polar nonreacted regions and comonomers. Additionally, the morphological texture that forms is not disrupted by excessive shear mixing. With reduced variation in the size or extent of high and low melt flow rate regions, the melt hydrolysis product is thought to be more uniform in postsolidification morphology and properties.

In a further embodiment, the invention relates to golf balls having covers comprising a material formed by the process described above having enhanced physical characteristics, i.e., in contrast to balls using prior art cover compositions. Golf balls having covers comprised of the composition described herein exhibit enhanced distance (i.e., resilience) without adversely affecting, and in many instances improving their "playability" characteristics, i.e., their impact resistance, spin, "click" and "feel", compression, etc.

DETAILED DESCRIPTION OF THE INVENTION

In accordance with the present invention, improved golf ball covers even can be made using polymers having the formula:

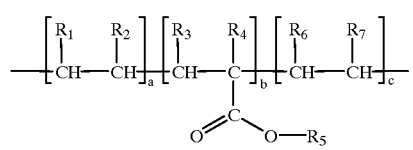

(I)

wherein:

$R_1$ is hydrogen, alkyl such as methyl, ethyl, and branched or straight chain propyl, butyl, pentyl, hexyl, heptyl, and octyl;

$R_2$ is hydrogen, lower alkyl including $C_1$–$C_5$; carbocyclic, aromatic or heterocyclic;

$R_3$ is hydrogen, alkyl such as methyl, ethyl and branched on straight chain propyl, butyl, pentyl, hexyl, heptyl and octyl;

$R_4$ is hydrogen, lower alkyl including $C_1$–$C_5$, carbocyclic, aromatic or heterocyclic;

$R_5$ is selected from the group consisting of $C_nH_{2n+1}$, for n=1 to 18 (which includes, for example, $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$) and phenyl, in which from 0 to 5 H within $R_5$ can be replaced by substituents selected from the group consisting of COOH, $SO_3H$, $NH_3$, succinic anhydride and their salts, F, Cl, Br, I, OH, SH, epoxy, silicone, lower alkyl esters, lower alkyl ethers, and aromatic or heterocyclic rings, with the proviso that $R_4$ and $R_5$ can be combined to form a bicyclic ring;

$R_6$ is hydrogen, lower alkyl including $C_1$–$C_5$, carbocyclic, aromatic or heterocyclic;

$R_7$ is hydrogen, lower alkyl including $C_1$–$C_5$, carbocyclic, aromatic or heterocyclic; and wherein a, b and c are the relative percentages of each co-monomer.

Alternatively, the golf ball covers of this invention can be made using polymers having the formula:

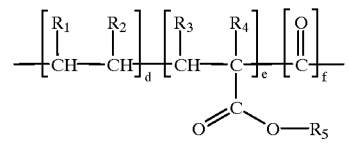

(II)

wherein:

$R_1$, $R_2$, $R_3$, $R_4$, and $R_5$ are as defined above; and wherein d, e and f are the relative percentages of each co-monomer.

Further, the golf ball covers of this invention can also be made using polymers having the formula:

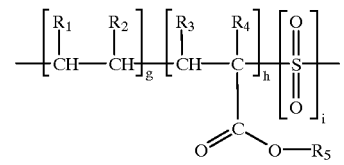

(III)

wherein:

$R_1$, $R_2$, $R_3$, $R_4$, and $R_5$ are as defined above; and wherein g, h and i are the relative percentages of each co-monomer.

Still further, the golf ball covers of this invention can be made using polymers having the formula:

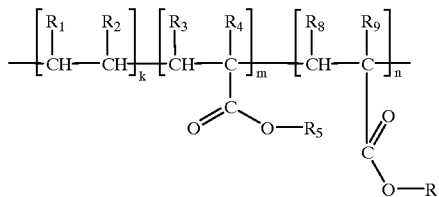

(IV)

wherein:

$R_1$, $R_2$, $R_3$, $R_4$, and $R_5$ are as defined above; $R_8$ is hydrogen, lower alkyl including $C_1$–$C_5$, carbocyclic, aromatic or heterocyclic; $R_9$ is hydrogen or lower alkyl including $C_1$–$C_5$; and $R_{10}$ is hydrogen, or is selected from the group consisting of $C_nH_{2n+}$, for n=1 to 18 and phenyl, in which from 0 to 5 H within $R_{10}$ can be replaced by substituents selected from the group consisting of COOH, $SO_3H$, $NH_3$, succinic anhydride and their salts, F, Cl, Br, I, OH, SH, epoxy, silicon, lower alkyl esters, lower alkyl ethers and aromatic or heterocyclic rings, with the proviso that $R_9$ and $R_{10}$ can be combined to form a bicyclic ring; and wherein k, m and n are the relative percentages of each co-monomer.

In addition, the golf ball covers of this invention can also be made using polymers having the formula:

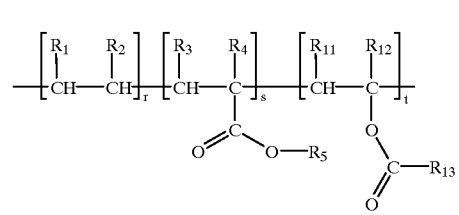

(V)

wherein:

$R_1$–$R_5$ are as defined above; $R_{11}$ is hydrogen, lower alkyl including $C_1$–$C_5$, carbocyclic, aromatic or heterocyclic; $R_{12}$ is hydrogen or lower alkyl including $C_1$–$C_5$; and $R_{13}$ is hydrogen or is selected from the group consisting of $C_nH_{2n+1}$ for n=1 to 18 and phenyl, in which from 0 to 5 H within $R_{13}$ can be replaced by substituents selected from the group consisting of COOH, $SO_3H$, $NH_3$, succinic anhydride and their salts, F, Cl, Br, I, OH, SH, epoxy, silicone, lower alkyl esters, lower alkyl ethers and aromatic or heterocyclic rings; and $R_{13}$ is the same as $R_{10}$, with the proviso that $R_{12}$ and $R_{13}$ can be combined to form a bicyclic ring; and wherein r, s and t are the relative percentages of each co-monomer.

Comonomer units according to the above formulae are easily manufactured according to techniques and synthetic strategies well known to the skilled artisan. These comonomers are also commercially available from a number of commercial sources.

The subject copolymers can be random, block or alternating polymers and may be made by blending two, three, four, five or more different monomers according to processes well known to one of ordinary skill in the art. Additionally, the subject polymers may be isotactic, syndiotactic or atactic, or any combination of these forms of types of polymers. The pendant groups creating the isotactic, syndiotactic or atactic polymers can be chosen to determine the interactions between the different polymer chains making up the resin to control the final properties of the resins used in golf ball covers. Aromatic and cyclic olefins can be used in the present invention as well as such specific groups as methyl and phenyl.

As used herein, the phrase straight chain or branched chain alkyl groups means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, pentene, hexene, heptene, octene, norbornene, nonene, decene and the like. The ordinary skilled artisan is familiar with numerous straight, i.e., linear, and branched alkyl groups, which are within the scope of the present invention.

In addition, such alkyl groups may also contain various substituents in which one or more hydrogen atoms is replaced by a functional group. Functional groups include, but are not limited to, hydroxyl, amino, carboxyl, sulfonic amide, ester, ether, phosphates, thiol, nitro, silane, succinic anhydride, epoxy and halogen (fluorine, chlorine, bromine and iodine), to mention but a few.

As used herein, substituted and unsubstituted carbocyclic groups include cyclic carbon-containing compounds, including but not limited to cyclopentyl, cyclohexyl, cycloheptyl, adamantyl, and the like. Such cyclic groups may also contain various substituents in which one or more hydrogen atoms is replaced by a functional group. Such functional groups include those described above, and lower alkyl groups having from 1–28 carbon atoms. The cyclic groups of the invention may further comprise a heteroatom. For example, in a specific embodiment, $R_2$ is cyclohexanol.

$R_1$ and $R_2$ can represent any combination of alkyl, carbocyclic or aromatic groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl. Aromatic groups include a hydrocarbon ring bearing a system of conjugated double bonds, usually comprising six or more even number of n (pi) electrons. Examples of aromatic compounds include, but are not limited to phenyl, naphthyl, anisyl, toluyl, xylenyl and the like. According to the present invention, aromatic also includes heteroaryl groups, e.g., pyrimidine or thiophene. These materials may also be substituted with any number of a variety of functional groups. In addition to the functional groups described above in connection with substituted alkyl groups and carbocyclic groups, functional groups on the aromatic compounds can include nitro groups.

The comonomers described herein can be combined in a variety of ways to provide a final copolymer with a variety of characteristics. The letters a, d, g, k, and r represent numbers which can range, independently, from 1–99 percent, or preferably from 10–95 percent, more preferably from 10–70 percent and most preferred, from about 10–50 percent. B, e, h, m and s can range, independently, from 99–1 percent, or preferably from 90–5 percent, or more preferably from 90–30 percent, or most preferred from 90–50 percent. C, f, i, n and t can range, independently, from 0 to 49 percent.

In an alternate embodiment of the present invention, graft copolymers of the polymers described above can be prepared, e.g., for use in forming golf ball covers. For example, graft polymers can be produced such that the graft segment making up the linkage between polymer chains comprises an anhydride, wherein "anhydride" is taken to mean a compound having the formula:

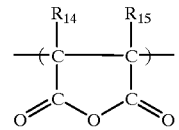

(VI)

wherein:

$R_{14}$ and $R_{15}$ are the same or different and are chosen from among hydrogen, linear or branched chain alkyl and substituted or unsubstituted carboxylic groups. Alternately, however, other grafting agents containing double or triple bonds can be used as grafting agents. Examples of these materials include, but are not limited to, acrylates, styrene and butadiene.

Grafting the polymer molecules of the present invention can be accomplished according to any technique known in the art. See, e.g., *Block and Graft Copolymers*, by R. Ceresa, pub. by Butterworths, London, U.S. (1962), incorporated by reference herein. It is preferred that any grafting of the polymers of the present invention be accomplished by adding from about 1 to about 50%, or preferably from about 1 to about 25% and most preferably from about 1 to about 15% of a grafting agent, such as an anhydride according to Formula VI above. The grafting agents can be added either as a solid or a non-aqueous liquid, to a polymer according to the present invention. Such post reaction grafting can make the final grafted polymer more flexible.

The polymers of the present invention can be synthesized by a variety of methods since it is well known in the art of polymer synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic polymer chemist knows well how to balance the competing characteristics of synthetic strategies. Thus the compounds of the present invention are not limited by the choice of synthetic strategy, and any synthetic strategy that yields the compounds described above can be used.

In summary, the polymer prepared according to the method of this invention comprises: (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

In the method of the invention, the metal base or metal salt is added in the form of a solid or a solution. Preferably, however, the metal base is in the form of a solid, such as a powder or a pellet. Powdered bases used in the invention preferably have an average powder particle diameter of from about 1–500 microns. More preferably, such powders have an average particle diameter of 10–100 microns. In the case of pellets, substantially any commercially available pellet particle size can be used.

Alternately, the metal base can be added in the form of a solution. Preferably, the solution is non-aqueous so that difficulties arising from incomplete removal of water during subsequent processing and use are avoided. Such non-aqueous solutions typically comprise solvents such as alcohol, acetic acid and acetic anhydride, although other solvents may, of course, be used.

The metal base is comprised of at least one metallic cation selected from the group consisting of the following periodic table groupings: IA, IB, IIA, IIB, IIIA, IIIB, IVA, IVB, VA, VB, VIA, VIIA, VIII, the Lanthanide series and the Actinide series. More preferably, the metal base is comprised of at least one metallic cation selected from the group consisting of: Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb.

The metal base of this invention is further comprised of at least one anion selected from the group consisting of: hydroxide, alkoxide, acetate, carbonate, bicarbonate, oxide, formate, nitrate.

The process of this invention for saponifying or hydrolyzing the polymers described herein comprises introducing the polymer into an extruder inlet zone, and melting and mixing the polymer in the inlet zone; passing the molten polymer through an addition zone within the extruder downstream from the inlet zone; and adding, under nonsaponification conditions as defined above, a metal base into the molten polymer as it passes through the addition zone until the polymer is at least partially saponified as indicated by, for example, its melt index or by titrating versus an acid.

This process is preferably accomplished using a twin screw extruder wherein the twin screw extruder comprises melting, addition, and mixing zone means. The process can further be accomplished using a master batch comprising a concentrated amount of metal base in a polymer, with the same or different composition as the polymer introduced into the inlet zone, wherein the master batch is added from a side-stream extruder. The side-stream extruder can be a twin screw extruder comprising melting, addition, and mixing zone means.

In yet another embodiment, the continuous process of this invention for saponifying or hydrolyzing the polymer of this invention comprises introducing the polymer into an inlet zone of an extruder, and melting and mixing the polymer in the inlet zone; passing the molten polymer through at least two addition zones connected in series; and adding, under nonsaponification conditions, a portion of a metal base into the molten polymer as it passes through each addition zone until the polymer is at least partially saponified.

This process can be accomplished using a twin screw extruder wherein the twin screw extruder comprises melting, addition, and mixing zone means. The process can further be accomplished using a single or a plurality of master batches comprising a concentrated amount of metal base in a polymer, with the same or different composition as the polymer introduced into the inlet zone and with the same of different amount of metal base as the other master batches, wherein the master batch is added from a side-stream extruder. The process can be accomplished with a single or with multiple side-stream extruders which are twin screw extruders comprising melting, addition, and mixing zone means.

In another embodiment of the invention the hydrolyzed polymers of the present invention are combined with another polymer or ionomer, according to methods well known in the art, and the resultant material is used in forming golf ball covers. In particular, the polymers of the present invention may be combined with any other polymer that is or can be used in golf ball covers.

A polymer with ionomeric character produced by this invention can be blended with the other similar polymers produced by this invention, but having a different metal base cation or distribution of cationic species than used that to make the first polymer, to yield a blend with desirable golf ball properties.

Alternatively, two different polymers with ionomeric character but with the same metal base cation produced by the process of this invention can be blended to yield a blend with desirable golf ball properties. For example, the two polymers can differ in their degree of hydrolysis, degree of subsequent acidification, molecular weight, molecular weight distribution, tacticity, blockiness, etc.

In yet another embodiment, two different polymers with ionomeric character, each differing by the metal base cation or distribution of cationic species used to make the two polymers can be blended to yield a blend with desirable golf ball properties.

In a separate embodiment of the present invention the polymers of the subject invention are combined with thermoplastic ionomers such as ethylene methacrylic acid ionomers, and ethylene acrylic acid ionomers, and their terpolymers, currently sold commercially under the trade names SURLYN® and IOTEK® by DuPont and Exxon respectively. These and other polymers and ionomers are described in U.S. Pat. No. 5,155,157 and Canadian Patent 963,380.

In a further embodiment of the present invention the polymers of the subject invention are combined with other non-ionic thermoplastics. Polymers of this type which can be used in conjunction with the polymers of the claimed invention in golf ball covers include: poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), poly[oxy(methyl)-3,3,3-trifluoropropylsilylene-3p3-difluoropentamethylene (methyl)-3,3,3-trifluoropropylsilylene], poly(silanes) and poly(silazanes), main-chain heterocyclic polymers and poly (furan tetracarboxylic acid diimides) as well as the classes of polymers to which they belong.

Other polymers may also be used in golf ball covers according to the present invention. In particular, any of the polymers that are disclosed in U.S. Pat. Nos. 2,924,593, 5,055,438 and 5,324,800, the disclosure of which is expressly incorporated herein, may be used in forming compositions for golf ball covers according to the subject invention.

More preferably, the other polymers which can be used in conjunction with the polymers of the claimed invention in golf ball covers include: block poly(ether-ester) copolymers, such as HYTREL® available from DuPont, block poly (ether-amide) copolymers, such as PEBAX® available from Elf Atochem, styrene-butadiene-styrene block copolymers, such as the KRATON D® grades available from Shell Chemical, styrene-(ethylene-propylene)-styrene or styrene-(ethylene-butylene)-styrene block copolymers, such as the KRATON G® series from Shell Chemical, either of the KRATON®s with maleic anhydride or sulfonic graft or functionality, such as the KRATON FD® or KRATON FG® series available from Shell Chemical, olefinic copolymers, such as the ethylene-acrylate or ethylene methacrylate series available from Quantum, ethylene-octene copolymers made from metallocene catalysts, such as the AFFINITY® or ENGAGE® series available from Dow, ethylene-alpha olefin copolymers and terpolymers made from metallocene catalysts, such as the EXACT® series available from Exxon, block poly(urethane-ester) or block poly(urethane-ether) or block poly(urethane-caprolactone), such as the ESTANE series available from BF Goodrich, polyethylene glycol, such as CARBOWAX available from Union Carbide, polycaprolactone, polycaprolactam, polyesters, such as EKTAR available from Eastman, polyamides, such as nylon 6 or nylon 6,6, available from DuPont and ICI, ethylene-propylene-(diene monomer) terpolymers and their sulfonated or carboxylated derivatives, and SANTOPRENE from Monsanto.

The polymer blends of this invention can be prepared with or without the addition of a compatibilizer and with varying molecular architecture of blend components, such as varying molecular weight, tacticity, degrees of blockiness, etc., as is well known to those knowledgeable in the art of blending polymers.

The amounts of polymers used in the subject invention can vary from 1 to 99 percent of the hydrolyzed polymers of the present invention to 99 to 1 percent of other polymers or ionomers which can be used in golf ball covers. More preferred ratios of 95 to 5 percent of the hydrolyzed polymers of the subject invention with 5 to 95 of one or more other polymer(s). Most preferred is from about 95 to about 10 of the subject hydrolyzed polymers and from about 5 to about 90 of other polymer or ionomer.

Preferably, the cover stock used to make a golf ball cover in accordance with the present invention is a blend of the polymers of the present invention and another cover material. Blending of the ionomer resins is accomplished in a conventional manner using conventional equipment. Good results have been obtained by mixing the comonomers or resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

Additional components which can be added to the golf ball compositions of the present invention include U.V. stabilizers such as TINUVIN™ 213 and TINUVIN™ 328, for example. Also, light stabilizers such as, for example, TINUVIN™ 770 and TINUVIN™ 765, may also be used. TINUVIN™ products are available from Ciba-Geigy. Other dyes, as well as optical brighteners and fluorescent pigments and dyes may also be used in the golf ball covers produced with polymers formed according to the present invention. Such additional ingredients may be used in any amounts that will achieve their desired purpose. However conventional amounts include the range of from about 0.05% to about 1.5%, or more preferably, from about 0.5% to about 1.0%.

Effective amounts of white pigment and violet agent can be added to the cover composition. Suitable violet agents include PV Fast Violet RL Special and Hostapern Violet RL Extra Strong sold by Hoechst Celanese Corporation; and Violet 23 sold by Sun Chemical Corporation. The amount of violet agent added to the cover composition is preferably about 0.0005% to about 0.002% based on total weight of cover stock. Good results have been obtained with about 0.001% by weight. Preferably, about 3.5% of the white pigment by weight of the total cover composition is used in the cover stock of the present invention.

Ultra marine blue pigments may also be used in golf ball covers formed according to the present invention.

Preferably the amount of ultra marine blue pigment used will range from about 0.01% to about 1.0% or more preferably from about 0.4% to about 0.8%.

Suitable white pigments include titanium dioxide, calcium carbonate, zinc oxide and zinc sulfide. These white pigments may be used in any amount which is suitable to provide a uniform white color of the desired brightness to the golf ball covers of the present invention. In particular, these white pigments may be incorporated in amounts of from about 0.001% to about 5.0%. The more preferred range of white pigment is from about 0.2% to about 0.4%.

Other conventional ingredients, e.g., fillers are well known to the person of ordinary skill in the art and may be included in the present invention in amounts effective to achieve their known purpose.

An optional filler component may be chosen to impart additional density to blends of the previously described components. The selection of such filler(s) is dependent upon the type of golf ball desired (i.e., one-piece, two-piece or three-piece), as will be more fully detailed below. Generally, the filler will be inorganic, having a density greater than about 4 g/cc, preferably greater than 5 g/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof. It is preferred that the filler components be non-reactive with the polymer components described above.

Additional optional additives useful in forming the golf balls of the present invention include acid copolymer waxes (e.g., Allied wax AC143 believed to be an ethylene/16–18% acrylic acid copolymer with a number average molecular weight of 2,040) which assist in preventing reaction between the filler materials (e.g., ZnO) and any acid moiety in the polymer; optical brighteners; surfactants; processing aids; etc.

The present polymers may be blended with any of the additional ingredients noted above, for example, to be used in a golf ball cover using any conventional blending technique. For example, the present compounds may be added to a vessel containing pelletized polymer resins and heated to 300° F.–500° F. Thorough mixing of the materials is accomplished by means of a screw in the heated vessel.

The polymers of the invention can be used to form any type of golf ball. In particular, two-piece golf balls comprising a cover surrounding a core are within the scope of the present invention, as are wound golf balls, in which a liquid, semi-solid or solid core is surrounded by an elastic synthetic material. The term "solid cores" as used herein refers not only to one piece cores but also to those cores having a separate solid layer beneath the cover and above the core as disclosed in U.S. Pat. No. 4,431,193 (the disclosure of which is incorporated herein), and other multilayer and/or non-wound cores. Any type of golf ball core can be used in the golf balls of the present invention. Preferred cores, however, include some amount of cis-butadiene. The subject polymers may also be used in golf balls having multiple covers and/or multiple cores.

Typically, the covers are formed around the solid or wound cores by either compression molding preformed half-shells of the cover material or by injection molding the cover stock about the core. Half-shells are made by injection molding a cover stock into a conventional half-shell mold in a conventional manner. The preferred method is compression molding of preformed half-shells.

In compression molding, the half-shells of the stock material are formed by injection molding the cover stock material into a conventional half-shell mold at 300° F.–520° F. for a short time. The preformed half-shells are then placed about a core and the assembly is introduced into a compression molding machine. The compression molding machine is a hydraulic press having an upper and lower mold plate. As taught by U.S. Pat. No. 4,508,309 issued Apr. 2, 1985, such mold plates have half molds, each of which is registered with another half mold in the opposite mold plate. It has been found that a golf ball is formed with a cover in accordance with the present invention when the half-shells are compression molded about a core at about 250 to 400° F. The molded balls are then cooled while still in the mold and finally removed when the cover is hard enough to be handled without deforming.

Alternatively, golf balls can be covered solely with the use of an injection molding technique. In injection molding, an injection molding machine is utilized in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

The present invention can be used in forming golf balls of any desired size. While USGA specifications limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.680 to about 1.95 inches can be used. Oversize golf balls above about 1.760 inches to golf balls having diameters as big as 2.75 inches are also within the scope of the present invention.

In addition, the present invention can also be used in forming golf balls having more than one cover layer and/or a dual core ball, i.e., a ball with a core having two or more layers of differing hardness. In the case of a ball with two or more cover layers, the outer most layer may be softer or harder, depending upon the "playability" requirements desired, than the one or more layer(s) formed inwardly of the outermost layer.

All patents cited in the foregoing text are herein incorporated by reference in their entirety.

It will be understood that the claims are intended to cover all changes and modifications of the preferred embodiments of the invention, herein chosen for the purpose of illustration, which do not constitute a departure from the spirit and scope of the invention.

I claim:

1. A golf ball comprising a cover and a core, said cover optionally comprising more than one layer and said core optionally comprising more than one layer, wherein at least one of said cover layers comprises a saponified polymer prepared by a process which comprises:

a) forming a polymer comprising (1) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms, and a vinyl ester or a vinyl ether of an alkyl acid having from 4 to 21 carbon atoms;

b) applying a sufficient amount of heat to said polymer to convert said polymer to a substantially molten state;

c) forming a mixture by adding an inorganic metal base to said molten polymer such that the viscosity of the mixture remains substantially unchanged from the viscosity of the molten polymer; followed by d) saponifying said mixture to produce a polymer salt adapted for forming improved golf ball cover layers, wherein a sufficient amount of the inorganic metal base is added to said molten polymer in forming said mixture to obtain a degree of saponification of said polymer ranging between about 1 and 50 percent.

2. The golf ball of claim 1, wherein the metal base is comprised of at least one metallic cation selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, and Pb.

3. The golf ball of claim 1, wherein the first monomeric component has the general formula:

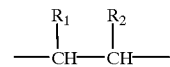

wherein:

$R_1$ is hydrogen or an alkyl group; and $R_2$ is hydrogen, lower alkyl including $C_1$–$C_5$; carbocyclic, aromatic or heterocyclic.

4. The golf ball of claim 1, wherein the second monomeric component is an unsaturated acrylate class ester having the general formula:

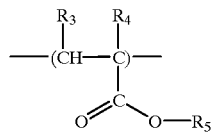

wherein:
R$_3$ is hydrogen or an alkyl group;
R$_4$ is hydrogen, lower alkyl including C$_1$–C$_5$, carbocyclic, aromatic or heterocyclic;
R$_5$ is selected from the group consisting of C$_n$H$_{2n+1}$, for n=1 to 18 and phenyl, in which from 0 to 5 H within R$_4$ can be replaced by substituents selected from the group consisting of COOH, SO$_3$H, NH$_3$, succinic anhydride and their salts, F, Cl, Br, I, OH, SH, epoxy, silicone, lower alkyl esters, lower alkyl ethers, and aromatic or heterocyclic rings with the proviso that R$_4$ and R$_5$ can be combined to form a bicyclic ring.

5. The golf ball of claim 1, wherein the third monomeric component is at least one of the monomers selected from the group consisting of:

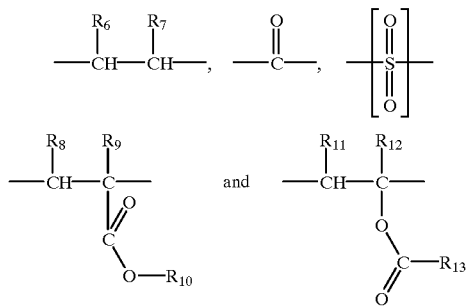

wherein:
R$_6$ is hydrogen, lower alkyl including C$_1$–C$_5$, carbocyclic, aromatic or heterocyclic;
R$_7$ is hydrogen, lower alkyl including C$_1$–C$_5$, carbocyclic, aromatic or heterocyclic;
R$_8$ is hydrogen, lower alkyl including C$_1$–C$_5$, carbocyclic, aromatic or heterocyclic;
R$_9$ is hydrogen, lower alkyl including C$_1$–C$_5$;
R$_{10}$ is hydrogen, or is selected from the group consisting of C$_R$H$_{2n+1}$, for n=1 to 18 and phenyl, in which from 0 to 5 H within R$_{10}$ can be replaced by substituents selected from the group consisting of COOH, SO$_3$H, NH$_3$ and their salts, F, Cl, Br, I, OH, SH, silicon, lower alkyl esters, lower alkyl ethers and aromatic or heterocyclic rings with the proviso that R$_9$ and R$_{10}$ can be combined to form a bicyclic ring;
R$_{11}$ is hydrogen, lower alkyl including C$_1$–C$_5$, carbocyclic, aromatic or heterocyclic;
R$_{12}$ is hydrogen or lower alkyl including C$_1$–C$_5$;
R$_{13}$ is hydrogen, or is selected from the group consisting of C$_R$H$_{2n+1}$, for n=1 to 18 and phenyl, in which from 0 to 5 H within R$_{13}$ can be replaced by substituents selected from the group consisting of COOH, SO$_3$H, NH$_3$ and their salts, F, Cl, Br, I, OH, SH, silicon, lower alkyl esters, lower alkyl ethers and aromatic or heterocyclic rings with the proviso that R$_{12}$ and R$_{13}$ can be combined to form a bicyclic ring.

6. The golf ball of claim 1, wherein said polymer is grafted by addition of a grafting agent.

7. The golf ball of claim 1, wherein said saponified polymer is blended with at least one additional thermoplastic ionomer.

8. The golf ball of claim 7, wherein said thermoplastic ionomer is at least one ionomer selected from the group consisting of ethylene methacrylic acid ionomers, ethylene acrylic acid ionomers, terpolymer ionomers comprising ethylene and methacrylic acid monomeric units, and terpolymer ionomers comprising ethylene and acrylic acid monomeric units.

9. The golf ball of claim 1, wherein said saponified polymer is blended with at least one non-ionic thermoplastic.

10. The golf ball of claim 9, wherein said non-ionic thermoplastic is at least one polymer selected from the group consisting of poly(butyl acrylate), poly(2-ethylbutyl acrylate), poly(heptyl acrylate), poly(silanes), block poly (ether-ester) copolymers, styrene-butadiene-styrene block copolymers, styrene-(ethylene-propylene)-styrene block copolymers, styrene-(ethylene-butylene)-styrene block copolymers, styrene-butadiene-styrene block copolymers comprising maleic anhydride functionality, styrene-(ethylene-propylene)-styrene block copolymers comprising maleic anhydride functionality, styrene-(ethylene-butylene)-styrene block copolymers comprising maleic anhydride functionality, styrene-butadiene-styrene block copolymers comprising sulfonic functionality, styrene-(ethylene-propylene)-styrene block copolymers comprising sulfonic functionality, styrene-(ethylene-butylene)-styrene block copolymers comprising sulfonic functionality, ethylene-acrylate copolymers, ethylene methacrylate copolymers, ethylene-octene copolymers made from metallocene catalysts, ethylene-alpha olefin copolymers and terpolymers made from metallocene catalysts, block poly(urethane-ester) copolymers, block poly(urethane-ether) copolymers, block poly(urethane-caprolactone) copolymers, polycaprolactone, polyesters, polyamides, ethylene-propylene-(diene monomer) terpolymers, sulfonated derivatives of ethylene-propylene-(diene monomer) terpolymers, and carboxylated derivatives of ethylene-propylene-(diene monomer) terpolymers.

11. A golf ball comprising a cover and a core, said cover optionally comprising more than one layer and said core optionally comprising more than one layer, wherein at least one of said cover layers comprises a saponified polymer prepared by a process which comprises:

(a) forming a polymer comprising: (1) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms and a vinyl ester or a vinyl ether of an alkyl acid having from 4 to 21 carbon atoms;

(b) introducing the polymer into an inlet zone of an extruder comprising an inlet and at least one addition zone;

(c) melting and mixing the polymer in the inlet zone;

(d) passing the molten polymer through an addition zone within said extruder;

(e) forming a mixture at a first temperature above the melting temperature of the polymer and below a second temperature at which saponification takes place by adding a solution consisting essentially of at least one metal base and at least one nonaqueous solvent into the molten polymer as it passes through the addition zone such that the viscosity of the mixture remains substantially unchanged from the viscosity of the molten polymer; followed by (f) saponifying said mixture at the second temperature to produce a polymer salt adapted for use in forming a golf ball cover layer, wherein a sufficient amount of the inorganic metal base is added to said molten polymer in forming said mixture to obtain a degree of saponification of said polymer ranging between about 1 and 50 percent.

12. The golf ball of claim 11, wherein the extruder has at least two addition zones connected in series and wherein a portion of said metal base solution is added in each said addition zone.

13. The golf ball of claim 11, wherein said saponified polymer is blended with at least one additional thermoplastic ionomer.

14. The golf ball of claim 13, wherein said thermoplastic ionomer is at least one ionomer selected from the group consisting of ethylene methacrylic acid ionomers, ethylene acrylic acid ionomers, terpolymer ionomers comprising ethylene and methacrylic acid monomeric units, and terpolymer ionomers comprising ethylene and acrylic acid monomeric units.

15. The golf ball of claim 11, wherein said saponified polymer is blended with at least one non-ionic thermoplastic.

16. The golf ball of claim 15, wherein said non-ionic thermoplastic is at least one polymer selected from the group consisting of poly(butyl acrylate), poly(2-ethylbutyl acrylate), poly(heptyl acrylate), poly(silanes), block poly (ether-ester) copolymers, styrene-butadiene-styrene block copolymers, styrene-(ethylene-propylene)-styrene block copolymers, styrene-(ethylene-butylene)-styrene block copolymers, styrene-butadiene-styrene block copolymers comprising maleic anhydride functionality, styrene-(ethylene-propylene)-styrene block copolymers comprising maleic anhydride functionality, styrene-(ethylene-butylene)-styrene block copolymers comprising maleic anhydride functionality, styrene-butadiene-styrene block copolymers comprising sulfonic functionality, styrene-(ethylene-propylene)-styrene block copolymers comprising sulfonic functionality, styrene-(ethylene-butylene)-styrene block copolymers comprising sulfonic functionality, ethylene-acrylate copolymers, ethylene methacrylate copolymers, ethylene-octene copolymers made from metallocene catalysts, ethylene-alpha olefin copolymers and terpolymers made from metallocene catalysts, block poly(urethane-ester) copolymers, block poly(urethane-ether) copolymers, block poly(urethane-caprolactone) copolymers, polycaprolactone, polyesters, polyamides, ethylene-propylene-(diene monomer) terpolymers, sulfonated derivatives of ethylene-propylene-(diene monomer) terpolymers, and carboxylated derivatives of ethylene-propylene-(diene monomer) terpolymers.

17. A one-piece golf ball comprising a saponified polymer prepared by a process which comprises:

a) forming a polymer comprising (1) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms, and a vinyl ester or a vinyl ether of an alkyl acid having from 4 to 21 carbon atoms;

b) applying a sufficient amount of heat to said polymer to convert said polymer to a substantially molten state;

c) forming a mixture by adding an inorganic metal base to said molten polymer such that the viscosity of the mixture remains substantially unchanged from the viscosity of the molten polymer; followed by d) saponifying said mixture to produce a polymer salt adapted for forming improved golf balls, wherein a sufficient amount of the inorganic metal base is added to said molten polymer in forming said mixture to obtain a degree of saponification of said polymer ranging between about 1 and 50 percent.

18. The golf ball of claim 17, wherein the metal base is comprised of at least one metallic cation selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, and Pb.

19. The golf ball of claim 17, wherein the first monomeric component has the general formula:

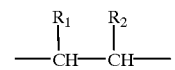

wherein:

$R_1$ is hydrogen or an alkyl group; and $R_2$ is hydrogen, lower alkyl including $C_1$–$C_5$; carbocyclic, aromatic or heterocyclic.

20. The golf ball of claim 17, wherein the second monomeric component is an unsaturated acrylate class ester having the general formula:

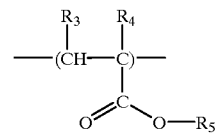

wherein:

$R_3$ is hydrogen or an alkyl group;

$R_4$ is hydrogen, lower alkyl including $C_1$–$C_5$, carbocyclic, aromatic or heterocyclic;

$R_5$ is selected from the group consisting of $C_nH_{2n+1}$, for n=1 to 18 and phenyl, in which from 0 to 5 H within $R_4$ can be replaced by substituents selected from the group consisting of COOH, $SO_3H$, $NH_3$, succinic anhydride and their salts, F, Cl, Br, I, OH, SH, epoxy, silicone, lower alkyl esters, lower alkyl ethers, and aromatic or heterocyclic rings with the proviso that $R_4$ and $R_5$ can be combined to form a bicyclic ring.

21. The golf ball of claim 17, wherein the third monomeric component is at least one of the monomers selected from the group consisting of:

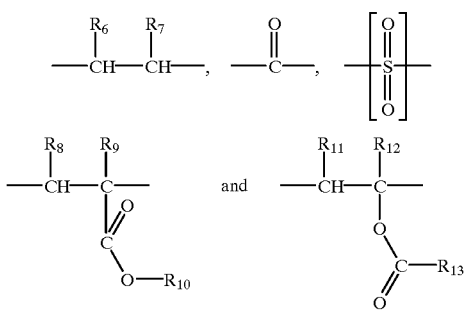

wherein:

- $R_6$ is hydrogen, lower alkyl including $C_1-C_5$, carbocyclic, aromatic or heterocyclic;
- $R_7$ is hydrogen, lower alkyl including $C_1-C_5$, carbocyclic, aromatic or heterocyclic;
- $R_8$ is hydrogen, lower alkyl including $C_1-C_5$, carbocyclic, aromatic or heterocyclic;
- $R_9$ is hydrogen, lower alkyl including $C_1-C_5$;
- $R_{10}$ is hydrogen, or is selected from the group consisting of $C_RH_{2n+1}$, for n=1 to 18 and phenyl, in which from 0 to 5 H within $R_{10}$ can be replaced by substituents selected from the group consisting of COOH, $SO_3H$, $NH_3$ and their salts, F, Cl, Br, I, OH, SH, silicon, lower alkyl esters, lower alkyl ethers and aromatic or heterocyclic rings with the proviso that $R_9$ and $R_{10}$ can be combined to form a bicyclic ring;
- $R_{11}$ is hydrogen, lower alkyl including $C_1-C_5$, carbocyclic, aromatic or heterocyclic;
- $R_{12}$ is hydrogen or lower alkyl including $C_1-C_5$;
- $R_{13}$ is hydrogen, or is selected from the group consisting of $C_RH_{2n+1}$, for n=1 to 18 and phenyl, in which from 0 to 5 H within $R_{13}$ can be replaced by substituents selected from the group consisting of COOH, $SO_3H$, $NH_3$ and their salts, F, Cl, Br, I, OH, SH, silicon, lower alkyl esters, lower alkyl ethers and aromatic or heterocyclic rings with the proviso that $R_{12}$ and $R_{13}$ can be combined to form a bicyclic ring.

22. The golf ball of claim 17, wherein said polymer is grafted by addition of a grafting agent.

23. A one-piece golf ball comprising a saponified polymer prepared by a process which comprises:
- (a) forming a polymer comprising: (1) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms and a vinyl ester or a vinyl ether of an alkyl acid having from 4 to 21 carbon atoms;
- (b) introducing the polymer into an inlet zone of an extruder comprising an inlet and at least one addition zone;
- (c) melting and mixing the polymer in the inlet zone;
- (d) passing the molten polymer through an addition zone within said extruder;
- (e) forming a mixture at a first temperature above the melting temperature of the polymer and below a second temperature at which saponification takes place by adding a solution consisting essentially of at least one metal base and at least one nonaqueous solvent into the molten polymer as it passes through the addition zone such that the viscosity of the mixture remains substantially unchanged from the viscosity of the molten polymer; followed by
- (f) saponifying said mixture at the second temperature to produce a polymer salt adapted for use in forming a golf ball, wherein a sufficient amount of the inorganic metal base is added to said molten polymer in forming said mixture to obtain a degree of saponification of said polymer ranging between about 1 and 50 percent.

24. The one-piece golf ball of claim 23, wherein the extruder has at least two addition zones connected in series and wherein a portion of said metal base solution is added in each said addition zone.

* * * * *